United States Patent [19]
Munson et al.

[11] Patent Number: 5,386,079
[45] Date of Patent: Jan. 31, 1995

[54] WASTEWATER TREATMENT PROCESS

[75] Inventors: Robert E. Munson, Baton Rouge, La.; Robert D. Macdonald, Houston, Tex.

[73] Assignee: Ciba-Geigy Corporation, Ardsley, N.Y.

[21] Appl. No.: 885,413

[22] Filed: May 19, 1992

[51] Int. Cl.$^6$ ............ A62D 3/00; B09B 3/00; A61L 11/00; C02F 1/68
[52] U.S. Cl. ............ 588/205; 588/215; 588/221; 210/903; 210/909; 210/749
[58] Field of Search ......... 588/205, 206, 208, 226, 588/215, 235, 221; 210/903, 908, 909, 915, 749, 754, 766

[56] References Cited

U.S. PATENT DOCUMENTS

| | | | |
|---|---|---|---|
| 2,768,167 | 10/1956 | Marzluff | 260/248 |
| 4,013,757 | 3/1977 | Berkowitz et al. | 210/754 |
| 4,246,104 | 1/1981 | Schmidt et al. | 210/906 |
| 4,274,955 | 6/1981 | Zeyer et al. | 210/612 |
| 4,415,658 | 11/1983 | Cook et al. | 210/909 |
| 4,745,064 | 5/1988 | Cook et al. | 210/600 |
| 4,758,347 | 7/1988 | Henz et al. | 210/917 |
| 4,808,391 | 2/1989 | Leavitt et al. | 423/321 |

OTHER PUBLICATIONS

Kirk Othmer, Encyclopedia of Chemical Technology, Third Edition vol. 7 pp. 397–408, John Wiley & Sons NY NY 1980.
Lawrence et al., Analysis of Triazine Herbicides by Combining Thin Layer Chromatography and Fluorimethy Journal of Chromatography 100 1974 175–179.
140431u Kinetics of the hydrolysis of triazines (1971) USSR.
140432v Kinetics of triazines (1971) USSR.
154805b (1971) Hydrolysis of triazines (1971) USSR.
J. Org. Chem., 1981, 46, 3661–3665 to degrade the heterocyclic aromatic rings thereof (1972).
Aqueous Organic Wastes pp. 222–228 David D. Leavitt, Enviromental Progress vol. 9 No. 4 Nov. 1990.

*Primary Examiner*—Gary P. Straub
*Attorney, Agent, or Firm*—Kevin T. Mansfield

[57] ABSTRACT

Wastewaters which are contaminated with heterocyclic aromatic compounds, especially wastewaters contaminated with biocidal heterocyclic aromatic compounds, or the by-products and intermediates thereof, can be treated to largely or even substantially completely degrade the heterocyclic aromatic rings by a process which comprises either adjusting the pH of said wastewaters to at least 11 and heating in a sealed vessel at a temperature of 120° C. to 175° C., or adjusting the pH of said wastewaters to 2.5 or less and heating in a sealed vessel at a temperature of 130° C. to 175° C., for an effective length of time.

14 Claims, No Drawings

WASTEWATER TREATMENT PROCESS

The present invention relates to a process for the treatment of wastewaters which are contaminated with heterocyclic aromatic compounds. More particularly it relates to the treatment of wastewaters which are contaminated with biocidal heterocyclic aromatic compounds, or the by-products and intermediates thereof.

In the course of commercial synthesis and purification of organic compounds, contaminated wastewaters are generated in a variety of ways, for example as filtrate and filter cake wash waters, extraction water, sump water, stripping residues and so forth. These contaminated waters must be treated to reduce the level of contaminants to acceptable levels to comply with environmental regulations before they can be discharged, for example to a river. There is continuing regulatory pressure to reduce contaminants to ever-decreasing levels, especially when the contaminants are biocides such as herbicides, pesticides or fungicides.

Triazine compounds in particular are widely used as selective herbicides and pesticides. They have been identified as groundwater contaminants in many areas of the world. Since groundwater is used to supply drinking water for many communities, this contamination has caused some concern. Accordingly the amounts of such compounds which may be discharged from manufacturing sites have been severely restricted.

Since there are environmental concerns with heterocyclic aromatic ring compounds per se, it is highly desirable to not merely hydrolyze labile substituents from the heteroaromatic ring, but rather to destroy the ring itself. However, biological purification of wastewater containing biocides can be difficult. Additionally, carbon adsorption treatment is both expensive and not very effective for a number of the compounds typically present in such wastewaters. Accordingly there is a need for a process for the effective treatment of wastewaters which are contaminated with heterocyclic aromatic compounds, especially wastewaters contaminated with biocidal heterocyclic aromatic compounds or the by-products and intermediates thereof, preferably a process which is simple and economical to operate, and does not require highly specialized and expensive equipment.

It has now been found that wastewaters which are contaminated with heterocyclic aromatic compounds, especially wastewaters contaminated with biocidal heterocyclic aromatic compounds, or the by-products and intermediates thereof, can be treated to largely or even substantially completely degrade the heterocyclic aromatic tings in a simple and economical manner, under surprisingly mild conditions and using only conventional equipment.

The process of the present invention comprises either adjusting the pH of wastewaters which are contaminated with heterocyclic aromatic compounds to at least 11 and heating in a sealed vessel at a temperature of 120° C. to 175° C., or adjusting the pH of the wastewaters to 2.5 or less and heating in a sealed vessel at a temperature of 130° C. to 175° C., for an effective length of time.

The heterocyclic aromatic compounds which may be treated according to the present invention advantageously have a 5- or 6-membered heterocyclic aromatic ring containing 2, 3 or 4 nitrogen, oxygen and/or sulfur atoms therein. Preferably said heterocyclic aromatic compounds contain a triazine, triazole or pyrimidine ring, which may be fused to a further heterocyclic or carbocyclic ring. Preferably the triazine, triazole or pyrimidine ring is substituted by halogen or by an OH, OR, SH, SR, $NH_2$, NHR or $NR_2$ group, where R is $C_1$-$C_6$alkyl which is unsubstituted or substituted by halogen, $C_1$-$C_3$alkoxy, phenyl, benzyl or $C_3$-$C_6$cycloalkyl, or is phenyl, benzyl or $C_3$-$C_6$cycloalkyl. Said compounds are known per se and many are commercially important as agricultural chemicals.

It is particularly preferred to treat according to the present invention, wastewaters containing ametryn, atrazine, aziprotryne, cyanazine, cyromazine, diazinon, desmetryn, 1-[2-(2,4-dichlorophenyl)-pent-1-yl]-1H-1,2,4-triazole, dimethametryn, diniconazole, dipropetryn, eglinazine-ethyl, etaconazole, hexaconazole, isazofos, methoprotryne, proglinazine-ethyl, prometon, prometryn, propiconazole, propazine, pyrazophos, pyridate, quizalofop-ethyl, secbumeton, simazine, simetryn, terbumeton, terbuthylazine, terbutryn. thiameturon-methyl, triadimefon, triasulfuron, triazaphos, trietazine or uniconazole, and the by-products and intermediates thereof. Of these it is especially preferred to treat according to the present invention, wastewaters containing atrazine, cyromazine, diazinon, etaconazoie. isazofos, propiconazole or simazine, and the by-products and intermediates thereof.

Since the wastewaters are treated at above the normal boiling point of water according to the inventive process, it is necessary to employ a sealed reactor capable of withstanding the autogenous pressure. This pressure is normally in the range of 25–100 psig for either the high or low pH process, a range within the capabilities of most general purpose chemical reactors. Therefore the exotic equipment and robust materials of construction necessary for the much more stringent conditions employed in wet air oxidation, for example, typically atmospheric oxygen pressurization to 50°–150 atmospheres at temperatures of 200°–300° C., are not required in the inventive process.

The process may be carried out batchwise or continuously, for example in a cascade of stirred reactors sized to provide an adequate residence time.

The temperature range for the inventive process, like the pressure, is within the capabilities of general purpose steam jacketed chemical reactors. It is generally preferable to operate the batch process at temperatures between the lower limits and 160° C., whereas the continuous processes will generally be operated at 150°–175° C.

It should be noted that, although the lower temperature limits and lower base or acid concentrations are limits of operation from a chemical standpoint, that is the process proceeds too slowly below those limits to be of commercial interest, the upper limits of temperature and concentrations of base or acid represent practical operating limits of standard processing equipment and concentrations of base or acid beyond which there is normally no advantage to offset the increased cost. They do not represent limits from the standpoint of operability. Indeed, certain circumstances such as the availability of special equipment or the need to process large volumes of contaminated wastewater in a reactor of limited volume, may make it advantageous to operate under more extreme conditions. Correspondingly, if only partial or incomplete degradation of the heterocyclic aromatic compounds is acceptable, operating the process at or below the above temperature limits may be acceptable.

When practicing the invention under alkaline conditions, it is important to adjust the pH to at least about 11 to obtain adequate reaction rates. Preferably the pH is initially adjusted to 12 to 14 since the pH drops during treatment of the wastewaters. While treatment is effective at even higher pH values than 14, this is more expensive and normally there is no offsetting advantage. Most preferably the pH is initially adjusted to 12 to 13.5.

The amount of base to add to adjust the pH can vary within wide limits, depending on the nature and amount of the contaminants. Generally it will be 1 to 12% by weight relative to the wastewater, preferably 2 to 8% and most preferably 3 to 6%.

When the wastewaters contain contaminants such as halotriazines which release acids during treatment, sufficient base should be provided to neutralize all the liberated acid and still maintain a pH of at least about 11 throughout the course of the wastewater treatment process. Suitable amounts of base can readily be determined by routine experimentation.

While it is most convenient to add all the base prior to heating the wastewaters above 100° C., additional base may be added during the course of the wastewater treatment process if in-process sampling indicates that the pH has dropped below about 11. Suitable equipment to add controlled amounts of a solid or liquid base to a reactor under pressure is well known in the art.

Any strong, environmentally acceptable inorganic base, such as an alkali metal hydroxide or an alkaline earth hydroxide such as those of calcium and magnesium, or their oxides is suitable for pH adjustment. Preferred bases are alkali metal hydroxides, such as those of lithium, sodium and potassium. Especially preferred for economic reasons and convenience is sodium hydroxide, especially in the form of an aqueous sodium hydroxide solution.

When practicing the invention under acidic conditions, it is important to adjust the pH to 2.5 or less to obtain adequate reaction rates. Preferably the pH is initially adjusted to 0.3 to 1.5 since the pH rises during the treatment. Most preferably the pH is initially adjusted to 0.4 to 1.0.

Hydrochloric is the preferred acid but other similar acids are also suitable. The amount of acid to add can vary within wide limits, depending on its concentration and the nature and amount of the contaminants. With 10% hydrochloric acid the amount will be generally 10 to 40% by weight relative to the wastewater, preferably 20 to 38% and most preferably 25 to 35%.

While it is most convenient to add all the acid prior to heating the wastewaters above 100° C., additional acid may be added during the course of the wastewater treatment process if in-process sampling indicates that the pH has risen above 2.5. Suitable equipment to add controlled amounts of acid to a reactor under pressure is well known in the art.

Treatment of wastewaters which are contaminated with heterocyclic aromatic compounds, especially wastewaters contaminated with biocidal heterocyclic aromatic compounds, or the by-products and intermediates thereof, according to the present invention, results in the substantially complete destruction of the biocides therein, largely through degradation of the heterocyclic aromatic rings, whether basic or acidic conditions are employed. However the inventive process does not degrade the hydrocarbon groups of hydrocarbon chains or carbocyclic rings attached to the heteroaromatic ring carbons. It merely disrupts the heteroaromatic ring, resulting in by-products which can more readily be treated, if desired, in a conventional waste treatment facility.

With typical wastewaters from the manufacture of biocidal triazines, treatment according to the present invention at high pH achieves 95-100% destruction of the triazine rings, accompanied by up to about a 70% reduction in TOC (total organic carbon). Treatment according to the present invention at low pH achieves 95-100% destruction of the biocides, but the destruction of triazine rings and TOC is less complete.

The time required for effective treatment can be varied from less than an hour to many hours by varying the temperature and concentration of base or acid. Increasing the temperature and/or concentration of base or acid, increases the rate of degradation of the contaminants. Within the temperature ranges disclosed above, with typical wastewaters from the manufacture of biocidal triazines, treatment according to the present invention can achieve about 90% destruction of the biocides within 30 minutes and virtually complete destruction in 2 to 8 hours.

The examples which follow illustrate the process of the invention. However it is not limited thereto.

EXAMPLE

A. Description of A Typical Laboratory Trial

Laboratory trials were run under autogenous pressure in a sealed two liter titanium Parr reactor (available from Parr Instrument Co., Moline, Ill. 61265). The reactor was equipped with an agitator with a water cooled packed seal, a tachometer and speed controller, a pressure gauge, a dip tube for sampling, a vapor space connection for $N_2$ pressure testing, a vapor space vent, and a thermowell. The thermowell contained two thermocouples. One was used to control the temperature of the reactor by means of a controller on the cylindrical Parr furnace in which the reactor was situated. The second thermocouple was connected to an independent temperature readout which served as a check on the controller setting.

For sampling, the dip tube was connected to a one-fourth inch stainless steel sample tube with a loop immersed in an ice bath to cool the sample. There was a nitrogen connection and valving to blow the sample tube clear after sampling. The nitrogen supply was also connected to the vapor space for pressure testing prior to carrying out an experiment.

In a typical experiment, approximately 1.6 liters of aqueous effluent from the commercial manufacture of a biocidal triazine were used. The base or acid concentration of the effluent was adjusted with 50% NaOH or 10% HCl to obtain the desired pH level.

A pre-start sample was taken for analysis. This sample, as were all the subsequent samples, was analyzed for TOC, $NH_3$ nitrogen, pH and sodium chloride. The sample was also analyzed by reversed phase HPLC ($C_6$ column, acetonitrile/water eluant) for triazine compounds known or suspected to be in the effluent, as well as for the daughter compounds.

The ~1.6 liters of pH-adjusted effluent were charged to the Parr reactor, which was then sealed, pressure tested with nitrogen and then vented down to atmospheric pressure and reseated. The stirrer was turned on and set at about 300 RPMs. The heater was set to the desired temperature (120°-160° C.) and turned on. The heating was done on the high setting until ~30° C. below the set point. Then it was switched to the low setting to avoid overshooting the desired temperature. Heat-up normally took 30 to 45 minutes. During heat-up, the pressure and temperature were monitored and recorded.

Once the desired temperature was reached, a sample was taken. The pressure in the reactor was used to force out the liquid sample through the dip tube, through the sampling tube with its cooling loop, and into the sample jar. In all cases, 20 to 40 mls. of sample were first forced through the sample loop to flush the lines. This waste was disposed of. The temperature of the sample during sampling was checked to avoid flashing. After the sample was taken, the sampling tube was blown clear with nitrogen. The sample was analyzed as described above for the initial charge sample. For the duration of a trial run (5 to 10 hours at temperature), the temperature and pressure were monitored and the sampling was repeated hourly.

B. Effluent Treatment at High pH

An effluent sample from the manufacture of cyromazine (2-cyclopropylamino-4,6-diamino-s-triazine) which had been treated with sodium hydroxide and stripped to remove excess ammonia was analyzed. Its pH was 12.65 and the sample contained 4640 ppm of cyromazine and over 6800 ppm of other triazine compounds. After 1 hour at 150° C. more than half of the total triazines had been destroyed, including almost 93% of the cyromazine. At the end of 7 hours triazine destruction was 99% and most of the triazines, including cyromazine, could not be detected. The final pH was 12.31.

A series of different effluent samples similar to that above, with about 4.4% added NaOH, were heated at about 125° C. for 2 hours. Average cyromazine levels dropped from about 6300 ppm to 1000. With 5-6% added NaOH and the same conditions, cyromazine destruction was in the 78-98% range.

Good results were also obtained with filtrate wastewater from atrazine and simazine production.

C. Effluent Treatment at Low pH

The pH of a cyromazine effluent sample similar to that above was adjusted to 0.94 with 10% HCl. After 2 hours at 150° C., the cyromazine level dropped from 5000 ppm to 1760 while the pH rose to about 2.5. During an additional 5 hours at temperature, the cyromazine level dropped to 1200 ppm while the pH rose to about 2.85.

The pH of a similar effluent sample was adjusted to 0.43 with 10% HCl. After 1 hour at 150° C., cyromazine was undetectable and the pit rose to 0.78. However more than 82% of the total triazines still remained. After an additional 5 hours at temperature, triazine destruction was about 80%. The final pH was 1.12.

A similar experiment was conducted at 130° C. and an initial pH of 0.45. After 2 hours at 130° C., the cyromazine level dropped from 4850 ppm to 210 while the pH rose to 0.62. After an additional 2 hours at temperature, cyromazine was undetectable and the pH rose to 0.69. Again more than 82% of the total triazines still remained. After an additional 3 hours at temperature, triazine destruction rose to about 37%. The final pH was 0.85.

What is claimed is:

1. A process for the treatment of wastewaters which are contaminated with heterocyclic aromatic organic compounds to destroy the heterocyclic aromatic rings thereof, which comprises adjusting the pH of said wastewaters to 2.5 or less and heating in a sealed vessel at a temperature of 130° C. to 175° C., and adding additional acid as needed during the wastewater treatment process to maintain the pH of the wastewaters at 2.5 or less for an effective length of time.

2. A process according to claim 1, wherein the heterocyclic aromatic organic compounds are biocidal heterocyclic aromatic compounds or the heterocyclic aromatic by-products and intermediates thereof.

3. A process according to claim 2, wherein the biocidal heterocyclic aromatic compounds are selected from herbicides, pesticides and fungicides.

4. A process according to claim 1, wherein the wastewaters are contaminated with heterocyclic aromatic compounds containing a 5- or 6-membered heterocyclic aromatic ring containing 2, 3 or 4 nitrogen, oxygen and/or sulfur atoms therein.

5. A process according to claim 4, wherein the wastewaters are contaminated with heterocyclic aromatic compounds containing a triazine, triazole or pyrimidine ring, which ring may be fused to a further heterocyclic or carbocyclic ring.

6. A process according to claim 5, wherein the wastewaters are contaminated with biocidal heterocyclic aromatic compounds containing a triazine ring.

7. A process according to claim 5, wherein the wastewaters are contaminated with biocidal heterocyclic aromatic compounds containing a triazine, triazole or pyrimidine ring which is substituted by halogen or by an OH, OR, SH, SR, $NH_2$, NHR or $NR_2$ group, where R is $C_1$–$C_6$alkyl which is unsubstituted or substituted by halogen, $C_1$–$C_3$alkoxy, phenyl, benzyl or $C_3$–$C_6$cycloalkyl, or is phenyl, benzyl or $C_3$–$C_6$cycloalkyl.

8. A process according to claim 7, wherein the wastewaters are contaminated with biocidal heterocyclic aromatic compounds selected from ametryn, atrazine, aziprotryne, cyanazine, cyromazine, diazinon, desmetryn, 1-[2-(2,4-dichlorophenyl)-pent-1-yl]-1H-1,2,4-triazole, dimethametryn, diniconazole, dipropetryn, eglinazine-ethyl, etaconazole, hexaconazole, isazofos, methoprotryne, proglinazine-ethyl, prometon, prometryn, propiconazole, propazine, pyrazophos, pyridate, quizalofop-ethyl, secbumeton, simazine, simetryn, terbumeton, terbuthylazine, terbutryn, thiameturonmethyl, triadimefon, triasulfuron, triazaphos, trietazine or uniconazole, and the heterocyclic aromatic and intermediates thereof.

9. A process according to claim 8, wherein the wastewaters are contaminated with biocidal heterocyclic aromatic compounds selected from atrazine, cyromazine, diazinon, etaconazole, isazofos, propiconazole or simazine, and the heterocyclic aromatic and intermediates thereof.

10. A process according to claim 1, which comprises heating in a sealed vessel at a temperature of 130° C. to 160° C.

11. A process according to claim 1, which comprises adjusting the pH of the wastewaters to 0.3 to 1.5.

12. A process according to claim 11, which comprises adjusting the pH of the wastewaters to 0.4 to 1.0.

13. A process according to claim 1, which comprises adjusting the pH of the wastewaters with hydrochloric acid.

14. A process according to claim 13, which comprises adjusting the pH of the wastewaters with 10 to 40% by weight relative to the wastewater of 10% hydrochloric acid.

* * * * *